April 17, 1928.  1,666,580

J. H. PARK

SCREEN

Filed April 12, 1926

Inventor
JOHN H. PARK.
Sol Shappirio
his Attorney

Patented Apr. 17, 1928.

1,666,580

UNITED STATES PATENT OFFICE.

JOHN HENRY PARK, OF HARRISBURG, PENNSYLVANIA.

SCREEN.

Application filed April 12, 1926. Serial No. 101,383.

This invention relates to screens, and particularly to screens provided with metal frames, and desirably used in connection with automobiles for example in connection with windshields to prevent ingress of dust, bugs, etc. when the windshield is open.

Among the objects and advantages of this invention there may be noted a screen preferably of metal of simple but durable construction, that is easily disassembled so that new wire screen may be placed therein, and that is easily and readily placed in or removed from its position on the automobile.

Other and further objects and advantages will appear from the more detailed description set forth below taken in connection with the accompanying drawing wherein there is shown by way of illustration and not by way of limitation, in—

Figure 1:
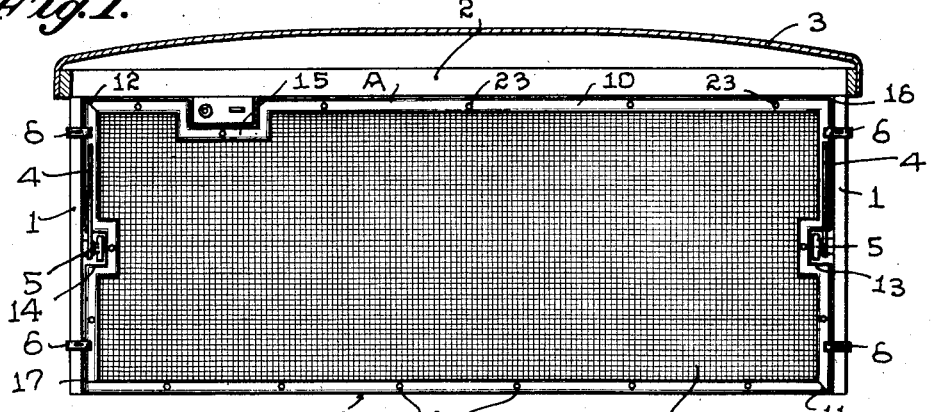
Figure 2:
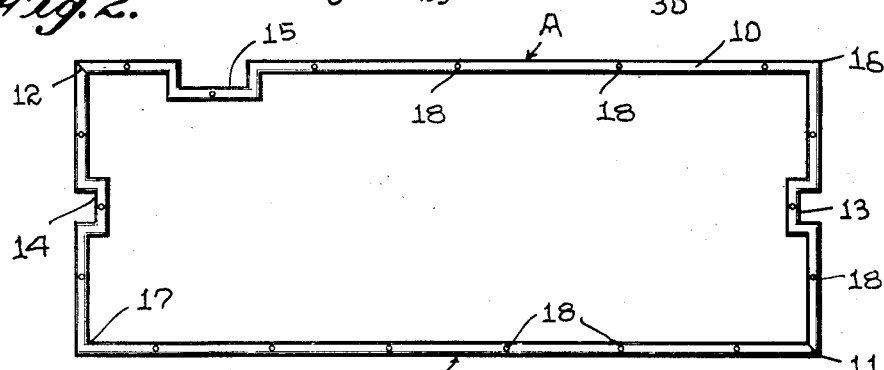
Figure 3:
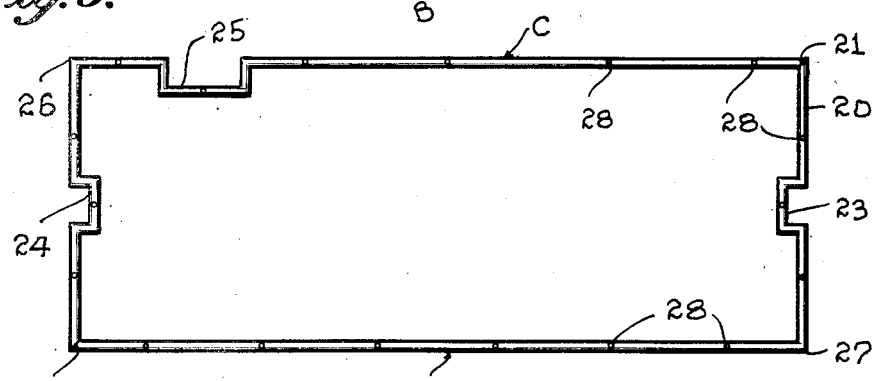
Figure 4:
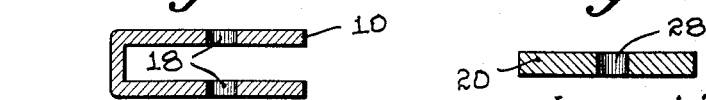
Figure 5:
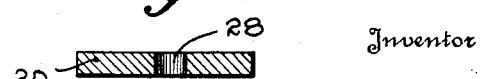

Figure 1, a complete screen structure in accordance with the most desired form of the invention in position inside of the windshield of an automobile, certain features of an automobile windshield and attendant parts also being shown;

Figure 2, a detail of the metal frame that is desirably used;

Figure 3, a detail of the metal filler that is desirably used;

Figure 4, a section through the metal frame;

Figure 5, a section through the metal filler; and in

Figure 6:
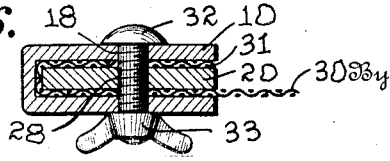

Figure 6, a sectional detail showing the metal filler in position within the metal frame and holding the screen in place.

And while the drawing shows the most desirable form that the invention takes, and in connection with which form this invention will be fully described, it will be obvious that various changes may be made in this most desirable structure, by those skilled in the art, without departing from the scope of this invention as hereinafter set forth.

In accordance with the illustrated form of this invention, there is shown a metal frame 10 provided with a metal filler 20 which serves to hold the screen 30 within the metal frame. Referring more particularly to the drawings, the metal frame 10 is desirably made in two L-shaped members A and B which are joined or may be joined or lie together at their ends as shown at 11 and 12 so that when so associated an oblong frame is formed. The ends of the L-shaped members are desirably shaped so that they may be brought together at these points. Any suitable type of joint may be used, or the members may be merely cut at a forty-five degree angle as shown so that they may be brought together at these points and form a continuous oblong frame. Each of the L-shaped members is desirably U-shaped in cross section. The frame 10 which is desirably made of metal, preferably sheet metal, is also provided with off-set portions 13 and 14, one being in each side portion of each L-shaped member, these off-set portions allowing easy access to the windshield adjusting brackets 4, 4 and the thumb-screws 5, 5 for retaining the brackets 4, 4 in set position. An additional off-set portion 15 is also desirably provided to allow for the usual wind-shield cleaner, that shown in the drawing being of the automatic type.

The metal filler 20 is also desirably formed of two L-shaped members C and D, adapted to fit together as shown at 21 and 22 to form a continuous oblong filler. The filler is desirably made of oblong cross section adapted to fit within the cross-section of the metal frame 20 so that a channel 31 is provided within which the screen 30 fits. The metal filler 20 is also provided with off-set portions 23 and 24 corresponding with the offset portions 13 and 14 of the metal frame, so that when the metal frame is filled with the metal filler, the offset portions 23 and 24 will lie within the offset portions 13 and 14. An offset portion 25 is also provided in the metal filler corresponding with and adapted to lie within the offset portion 15 on the metal frame.

For purposes of ready assembly, etc., it is desirable to so form the frame and filler, that the corner of each L-shaped filler member, 26, 27, fits within the corners of the frame 11 and 12 which are not continuous; and vice versa the corners 21 and 22 of the metal filler which are not continuous, are placed within the continuous corners 16 and 17 of the frame. Such an arrangement while highly desirable from the standpoint of rigidity and strength in the structure, and also allowing ready assembly and disassembly of the parts, is not essential. The filler 20 and frame 10 are provided with a series of aligned openings 18, 18 and 28, 28 respectively, so that when assembled the openings or holes will be aligned and adapted to receive threaded bolts 32 provided with wing-nuts 33, which serve to retain the parts in position and also to hold the screen in position.

The parts are readily assembled by placing the screen preferably of metal within the U-shaped cross sectional frame members and bringing the filler members into position within the frame members. Bolts 32 are then inserted through the openings 18 and 28 and corresponding openings desirably formed in the screen, although the latter are not essential since the bolts may be readily forced through the screen. When placed, wing-nuts are then tightened upon the bolts to hold the structure together. The frame having thus been assembled with the screen and filler, it is placed in position within the standards 1, 1 of an automobile, below the cross member 2 usually found connecting the standards together just below the top 3. It is desirable to place the screen on the inside of the windshield so that the windshield may be readily opened outwardly. However the screen may be placed on the outside of the windshield so that the latter may be opened inwardly.

In the most desirable structure illustrated, the wire screen has been shown as a separate element from the filler members, but it is obvious that if desired, the wire screen may be permanently attached to the filler members in any desired way, although the structure illustrated has been found to operate best.

Further while the screen has been illustrated as covering the entire windshield opening, it is obvious that it may be made to cover only one-half of such opening or any other portion thereof. Further, while the structure has been illustrated in connection with screens for automobile windshields, it is obvious that the structure illustrated has many other desirable uses in screens for other purposes. And while the frame members have been shown as most desirably of U-shaped cross section, it is apparent that other cross-sectional shapes may be utilized, all within the scope of the present invention. In the structure as illustrated it is best to provide clamps 6, 6 to hold the complete screen structure in place within the standards 1, 1, but any other means may be used for the same purpose.

Having thus set forth my invention, I claim:

1. A screen for automobile windshields composed of two separable L-shaped frame members of U-shaped cross section, a filler composed of L-shaped members lying within the U-shaped channel of the frame members and holding a reticulated sheet within said frame, the corners of the L-shaped filler members lying at the points of joinder of the L-shaped frame members, and means for securing the parts together.

2. A screen for automobile windshields composed of two separable L-shaped frame members, a filler composed of L-shaped members adapted to hold a reticulated sheet upon said frame, the corners of the L-shaped filler members lying at the point of joinder of the L-shaped frame members, and means for securing the parts together.

JOHN HENRY PARK.